(12) United States Patent  (10) Patent No.: US 8,087,585 B2
Greene  (45) Date of Patent: Jan. 3, 2012

(54) BAGGAGE HANDLING SYSTEM AND METHOD

(76) Inventor: Morton Greene, Potomac Falls, VA (US)

( * ) Notice: Subject to any disclaimer, the term of this patent is extended or adjusted under 35 U.S.C. 154(b) by 61 days.

(21) Appl. No.: 12/218,395

(22) Filed: Jul. 15, 2008

(65) Prior Publication Data

US 2010/0012713 A1    Jan. 21, 2010

(51) Int. Cl.
*G07B 15/02*  (2011.01)
(52) U.S. Cl. ...................................................... 235/384
(58) Field of Classification Search .................. 235/375, 235/384, 487, 492
See application file for complete search history.

(56) References Cited

U.S. PATENT DOCUMENTS

| | | | | |
|---|---|---|---|---|
| 4,634,849 A | * | 1/1987 | Klingen | 235/487 |
| 5,986,550 A | * | 11/1999 | Rapaport et al. | 340/572.3 |
| 6,158,658 A | * | 12/2000 | Barclay | 235/384 |
| 6,222,452 B1 | * | 4/2001 | Ahlstrom et al. | 340/572.1 |
| 6,471,878 B1 | * | 10/2002 | Greene et al. | 216/13 |

* cited by examiner

*Primary Examiner* — Seung Lee
(74) *Attorney, Agent, or Firm* — Connolly Bove Lodge & Hutz LLP

(57) ABSTRACT

A label for tracking and tracing baggage in a baggage handling system is disclosed. The label includes resonators doped into the label. The resonators providing the label with a unique signature and are capable of being read from approximately 2 meters. A baggage handling system incorporating a resonator based label system is also disclosed. The system includes at least one piece of baggage, a label for tracking and tracing baggage in the baggage handling system, at least one reader for reading the label in order to properly direct the attached at least one piece of baggage, and at least one baggage mover suitable for moving the at least one piece of baggage within the baggage handling system. The label includes resonators doped into the label that provide the label with a unique signature, the label being attached to and referenced with said at least one piece of baggage.

25 Claims, 5 Drawing Sheets

BAGGAGE HANDLING SYSTEM AND METHOD

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION a. Field of the Invention

The instant invention relates to the field of identification, and in particular to identification of baggage within a baggage handling system.

b. Description of Related Art

A barcode is a machine-readable representation of information, often having dark ink on a light background to create high and low reflectance which is converted to digitally comprehensible 1s and 0s. Originally, barcodes stored data in the widths and spacings of printed parallel lines, but today they also come in patterns of dots, concentric circles, and text codes hidden within images. Barcodes can be read by optical scanners called barcode readers or scanned from an image by special software. Barcodes are widely used to implement Auto ID Data Capture (AIDC) systems that improve the speed and accuracy of computer data entry. One deficiency of barcode is that the information is contained within the barcode itself.

At present, bar codes are one suggested method of tagging luggage, baggage, parcels, packages and the like (hereinafter collectively referred to as "baggage") for security clearances, such as that performed at airports, train stations, or the like. However, such systems suffer from many of the problems discussed hereinthroughout, namely lack of associative information, very limited readability and reading range, loss of bar code tags, differing methodologies in bar coding, and the like. Other alternative methodologies for security clearance scanning, such as active and/or passive radio frequency (RF) tagging suffer many of the same drawbacks as mentioned with respect to bar coding, and additionally present issues with regard to the expense of generating unique tags, powering tags where applicable, high power or highly radiative interrogators and/or readers, etc. Further, such tags are typically not programmable, that is, information typically cannot be associated with such RF tags after such tags are created.

Therefore a need exists for a baggage tagging apparatus, method and system that does not contain personal information but that can be associated with identifying information, that can be read from increased distances and off-angles at low power, and that can be read through materials.

BRIEF SUMMARY OF THE INVENTION

A label for tracking and tracing baggage in a baggage handling system is disclosed. The label includes resonators doped into the label. The resonators providing the label with a unique signature and are capable of being read from approximately 2 meters. A baggage handling system incorporating a resonator based label system is also disclosed. The system includes at least one piece of baggage, a label for tracking and tracing baggage in the baggage handling system, at least one reader for reading the label in order to properly direct the attached at least one piece of baggage, and at least one baggage mover suitable for moving the at least one piece of baggage within the baggage handling system. The label includes resonators doped into the label that provide the label with a unique signature, the label being attached to and referenced with said at least one piece of baggage.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts and in which.

DETAILED DESCRIPTION OF THE INVENTION

Figure 1:
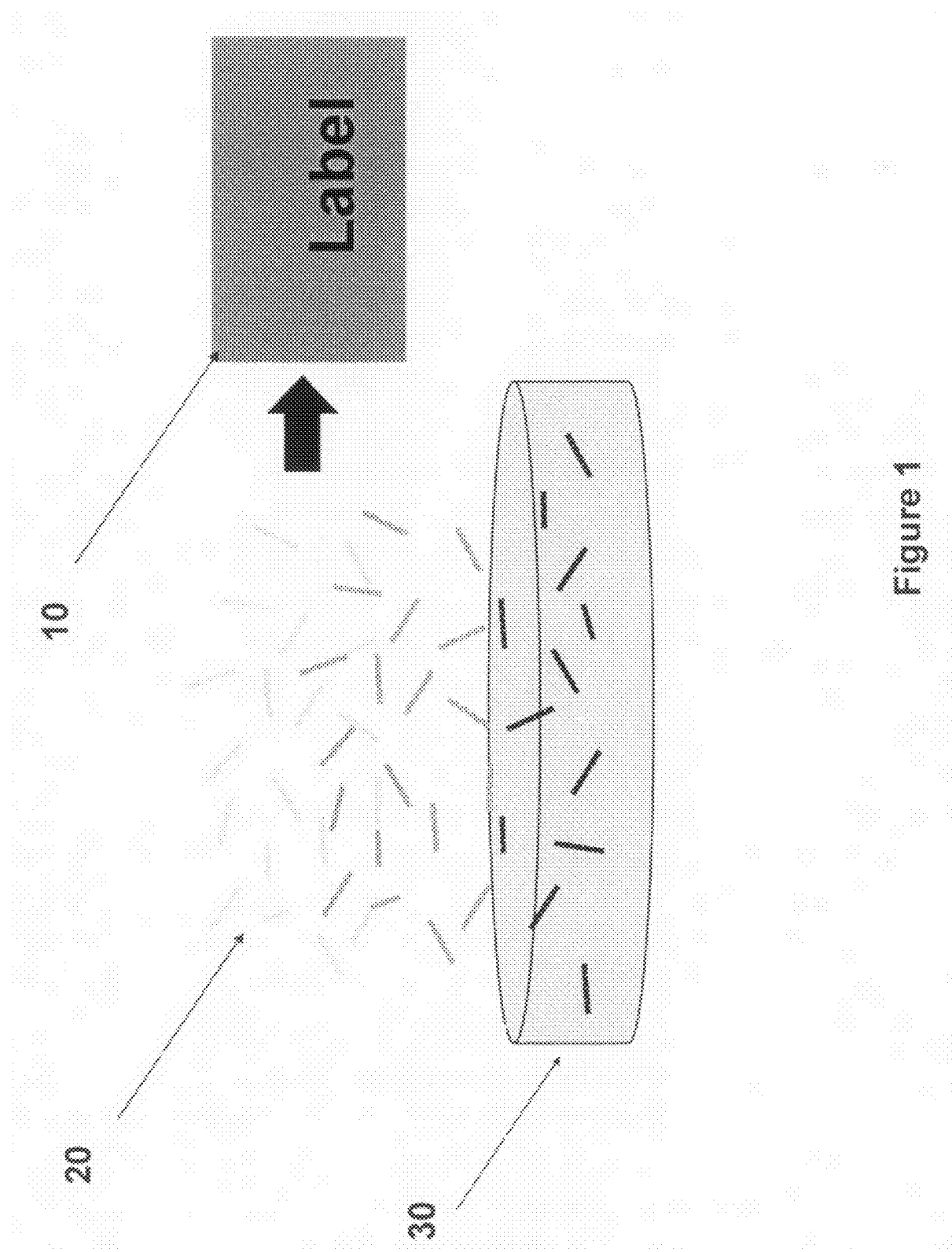
FIG. 1 is a diagrammatic illustration of inserting resonators into a label according to an aspect of the present invention.

It is to be understood that the figures and descriptions of the present invention have been simplified to illustrate elements that are relevant for a clear understanding of the present invention, while eliminating, for the purpose of clarity, many other elements found in typical tagging and baggage handling systems. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

Baggage handling systems, such as at an airport for example, play a crucial role in keeping travelers happy and safe, and in fact such systems may make the difference in an airport's ability to attract or keep a major airline, an airline's ability to attract and keep a customer, and a customer's decision to travel at all.

From a general perspective, a typical airport-based baggage-handling system, as will be discussed in certain exemplary embodiments hereinthroughout, has three main jobs: (1) move bags from the check-in area to the departure gate; (2) move bags from one gate to another during transfers; and (3) move bags from the arrival gate to the baggage-claim area. Of course, those skilled in the art will understand that airport baggage handling is merely exemplary with regard to the present invention, and that other baggage handling systems, such as those at train, bus or freight stations are also contemplated by the present invention.

The goal of a baggage handling system is thus typically to move bags from point to point in a generally correlated fashion, in some instances correspondent with passengers moving between the points. If the bags move slower than the respective travelers, it leads to frustrated travelers waiting for bags, or bags failing to make connections on time, for example. If the bags move too fast, bags may make connections that passengers miss, for example. Neither outcome is acceptable.

Each travel industry often dictates its own baggage-related requirements. For instance, the time allotted for a bag to make it from the check-in area to the gate maybe determined by how fast a passenger can make the same trip. In some airports, for example, it might only be a short walk to the passenger terminal, while in others, passengers might have to take a train, thereby increasing the acceptable time to scan and deliver baggage.

Airports, for example, may use a variety of methods to deliver, scan and route baggage. For example, destination-coded vehicles (DCVs) are unmanned carts propelled by linear induction motors mounted to the tracks and may load and unload bags without stopping. Conveyors may also be used. The conveyors may be equipped with junctions and sorting machines to automatically route the bags to the gate. Automatic scanners may scan labels as described herein.

A baggage-handling system is itself akin to a transportation system. For example, a baggage handling system may have a longer route system, namely the DCV, and a shorter route system, namely the conveyors, over which the bags are transported. When the longer or shorter route system has a blockage or failure, bags may be routed around the blockage. Generally, speaking, baggage begins and ends its travels on a portion of the shorter route system (i.e. conveyors) and in between has moved from the conveyors to the DCV tracks for larger distance travel, such as from terminal to terminal or gate to gate. In addition to the use of DCV tracks for longer transport of bags, DCV are generally designed to never stop. The DCV tracks often go from the check-in area to the passenger terminals of an airport via a tunnel or set of tunnels.

The DCV may take the form of a metal cart with wheels on the bottom and a plastic tub on top. The DCV may include a passive radio-frequency circuit that broadcasts a unique number identifying that particular cart. Such a DCV may be guided by a metal track and may be propelled by linear induction motors mounted to the track. Unlike most electric motors, a linear induction motor has no moving parts. It uses electromagnets to build two magnetic fields—one on the track and one on the bottom of the DCV—that are attracted to each other. The motor moves the magnetic field on the track, pulling the DCV along behind it at a high rate of speed. The main advantages of this system are its speed, efficiency, durability, precision and manageability.

For example, in some baggage-handling systems, a metal plate may hang down from the bottom of the DCV and may ride between the linear induction motors. The motors may, for example, be located about every 50 feet (15 m). Each time a DCV passes through one of the motors, the DCV receives a boost from the motor that allows it to maintain speed while it coasts to the next motor on the track. The holder on the DCV is mounted on a pivot and holds the baggage within this holder. Most of the time, the holder is tilted backward so that the bags cannot slide out. The DCV may lock the holder in this position. When a DCV comes into a loading or unloading area, a bar on the track engages a lever on the DCV, which lever tilts the holder into a substantially flat position. Conveyors may be equipped with optical pickups to detect the location of a bag and verify that the bag made it into or off of the holder of the DCV.

Conveyors take each bag to the appropriate destination. For example, conveyors may route bags headed out of the country through X-ray machines and other security devices. Conveyors also may take a bag to the DCV tracks to be routed from terminal to terminal within the airport.

The baggage-handling system may thus make all of the decisions about where a bag is headed and additionally how it is going to get there. A computer system may preferably endeavor to keep track of the location of every bag, every traveler's itinerary, and the flight schedules, including original scheduled departure and arrivals and offset schedules to account for delays and the like. The baggage-handling system may account for such delays and scheduling offsets and accordingly control and route associated bags, but to do so most securely should have the ability to associate the aforementioned bags with the corresponding traveler and flight schedule efficiently and with minimal errors.

Typically, the baggage handling process begins when a passenger checks in and hands a bag to an agent. When this happens, the agent may pull up the passenger's itinerary on a computer and/or may print out one or more labels to attach to each piece of luggage. The typical label may have travel information on it, including destination and any stopover cities, for example. The label of the present invention may additionally include resonators for creating a digital signature, as further described herein below. At the ticket counter, such label may be affixed to each piece of luggage before it is sent down a conveyer, for example. The computers in the baggage-handling system may then use the signature of such a label to look up the passenger associated with the baggage, passenger's itinerary, or the like.

After check-in, as the bag begins its journey into the baggage handling system, the bag may be scanned using a scanner, which may take the form of a single scanner above or to the side of the conveyor, and/or of an array of scanners arranged 360 degrees around the conveyor, for example. Scanning the bags yields some return of successful scans, such as for example ninety-five percent. Each successfully scanned bag may then continue in the baggage handling system to its next scheduled location. The unsuccessfully scanned baggage may be dealt with, such as by routing the baggage to another conveyor to be manually scanned, for example. Once the baggage-handling system has read the label, the location of the bag may be known as long as the bag remains under the care of the baggage handling system—that is, the baggage-handling system may continue to track its movement.

Various methodologies may be employed to direct baggage within a baggage-handling system. For example, as a bag approaches a junction, the baggage-handling system may determine if the bag needs to continue on its current path or be routed to a new conveyor. In the event that a new conveyor is needed, a pusher may push the bag onto another conveyor. If continuing on its current path is needed, the junction may let the bag pass. Through this network of conveyors and junctions, a bag may be sent to nearly any destination within the baggage-handling system automatically. At all points along this network, security may dictate that the subject bag be tracked.

In order to get bags to an airplane, the bags may make their way from a conveyor or DCV, for example, onto a short conveyor to a sorting station on the ground at the gate. At the sorting station, baggage handlers may load the bags onto carts or into special containers that go right into the airplane. The baggage handlers may follow certain standard rules when loading the plane. For example, bags that will be making a transfer after the flight are loaded into separate areas than bags that will be heading to baggage claim. A monitor at the sorting station identifies to the handlers which bags are going where. This could, of course, be an automatic sorting based on the tags of the present invention discussed hereinthroughout. After the bags are loaded into carts or containers, baggage handlers bring the carts or containers the short distance to the plane and load the bags onboard. Some planes are bulk loaded, meaning the bags are brought up one-by-one on a conveyor and placed into shelves in the cargo hold. Other planes are container loaded, meaning that special containers are loaded on the ground and then placed into the plane.

When unloading a plane, the baggage handlers basically follow the same logic as that described immediately hereinabove. Transferring bags may be loaded onto conveyors, where they move through scanning stations and then are routed onto the DCV track. The DCV takes the bags to the proper gate and unloads them as described herein. Non-transferring bags or terminating bags may be loaded into carts and pulled by tug to the baggage-claim area. Since the bags are already sorted when they come off the plane, it is relatively easy to keep the transferring bags separate from the terminating bags. When the bags get to the baggage-claim area, they are loaded onto a short conveyor that deposits them onto the carousel. Oddly shaped items, for example, skis and golf bags, may be routed to a special carousel.

Referring now to FIG. 1, there is shown a diagrammatic illustration of a label having inserted therein a plurality of resonators according to an aspect of the present invention. As may be seen in FIG. 1, a label 10 may be created using resonators 20 that are mixed into the materials 30 that the label is made from. For example, if label 10 is made from a plastic, or paper, the plastic or paper may be randomly doped with resonators 20 as shown, such as by insertion of the resonators into the pulp used to create the label, or doped into the paper as it is created. In particular, the doping of the material 30 with the resonators 20 may be controlled so as to provide optimal randomness in the label 10. The resonators, as used herein, may be any resonant material capable of resonance that may be placed into a label and recognized upon interrogation, such as dipoles, nano-resonators, crystals, or the like. The randomness may provide a unique security aspect for the system, as will be described herein throughout.

Needless to say, the paper or plastic of the present invention for the label may additionally provide identifying characteristics or orienting features for scanning, in addition to the aforementioned resonators. Such identifying characteristics may include bar codes, colors, textures, patterns, and the like. Such orienting features may allow for the label scanner to comprehend the orientation of the label with respect to the scanner, and may include, for example, a bar code or a numeric label in a particular location, a particular shape, or a fluorescent coloring along with a size to allow for an optical orientating.

Figure 2:
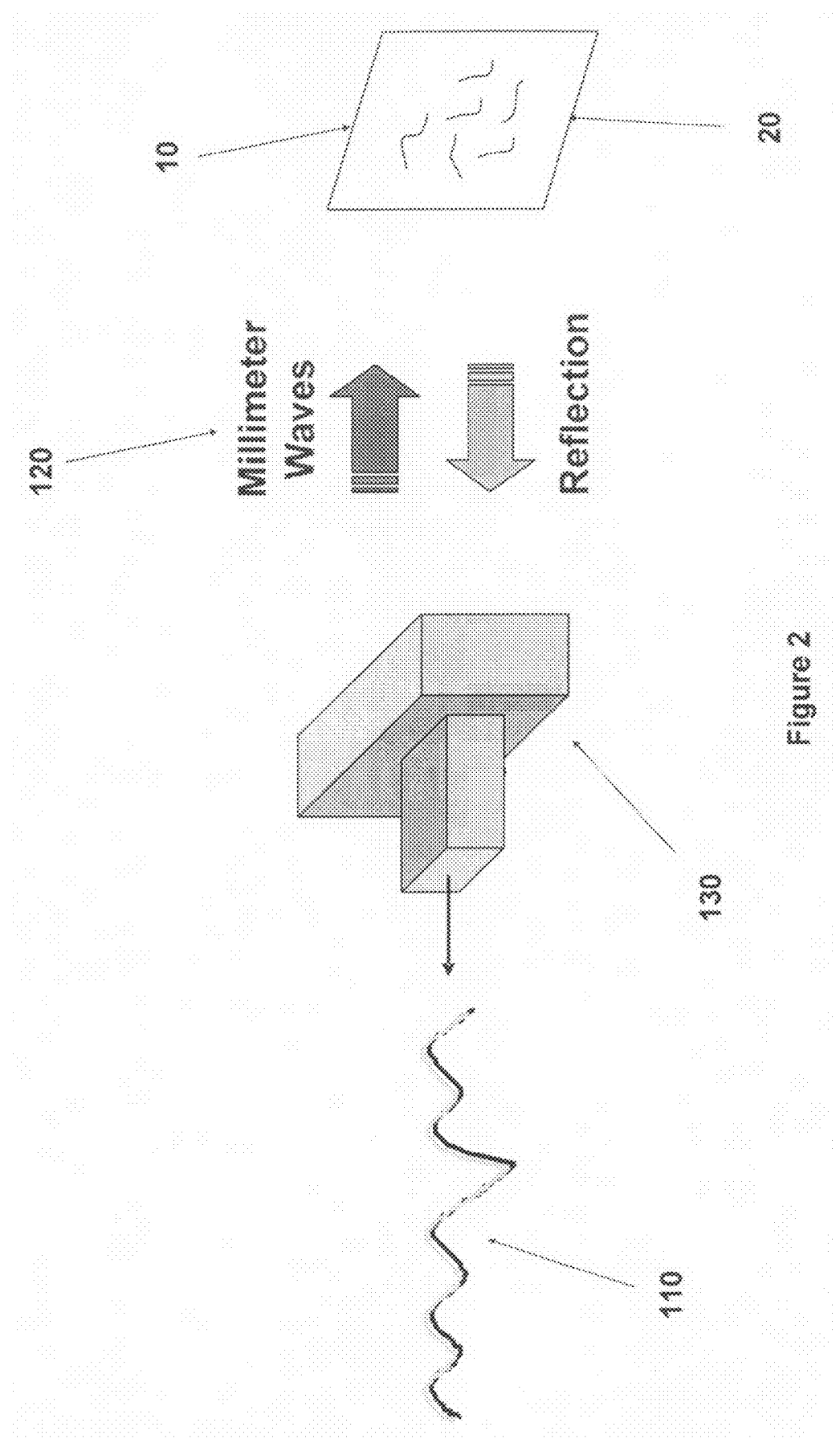
FIG. 2 is a time domain signature of the label doped with resonators according to an aspect of the present invention.

Referring now also to FIG. 2, there is shown a time domain signature of an exemplary label doped with resonators. As may be seen in FIG. 2, a resonant pattern 110 appears responsive to interrogation based on the signature of the resonators 20 that were doped into the label 10. Particularly, the doped resonators 20 may be like a fingerprint, or signature, with respect to a given label 10. In this way interrogation of a given label 10 with a beam 120 and sensor 130 may provide a resonant signature 110 that uniquely, or semi-uniquely, identifies the label 10. This signature 110 may be converted to a number, and since the signature 110 is unique, the converted number also may be unique based on a particular label 10. This technique is sometimes referred to as time domain imaging spectroscopy.

Figure 3:
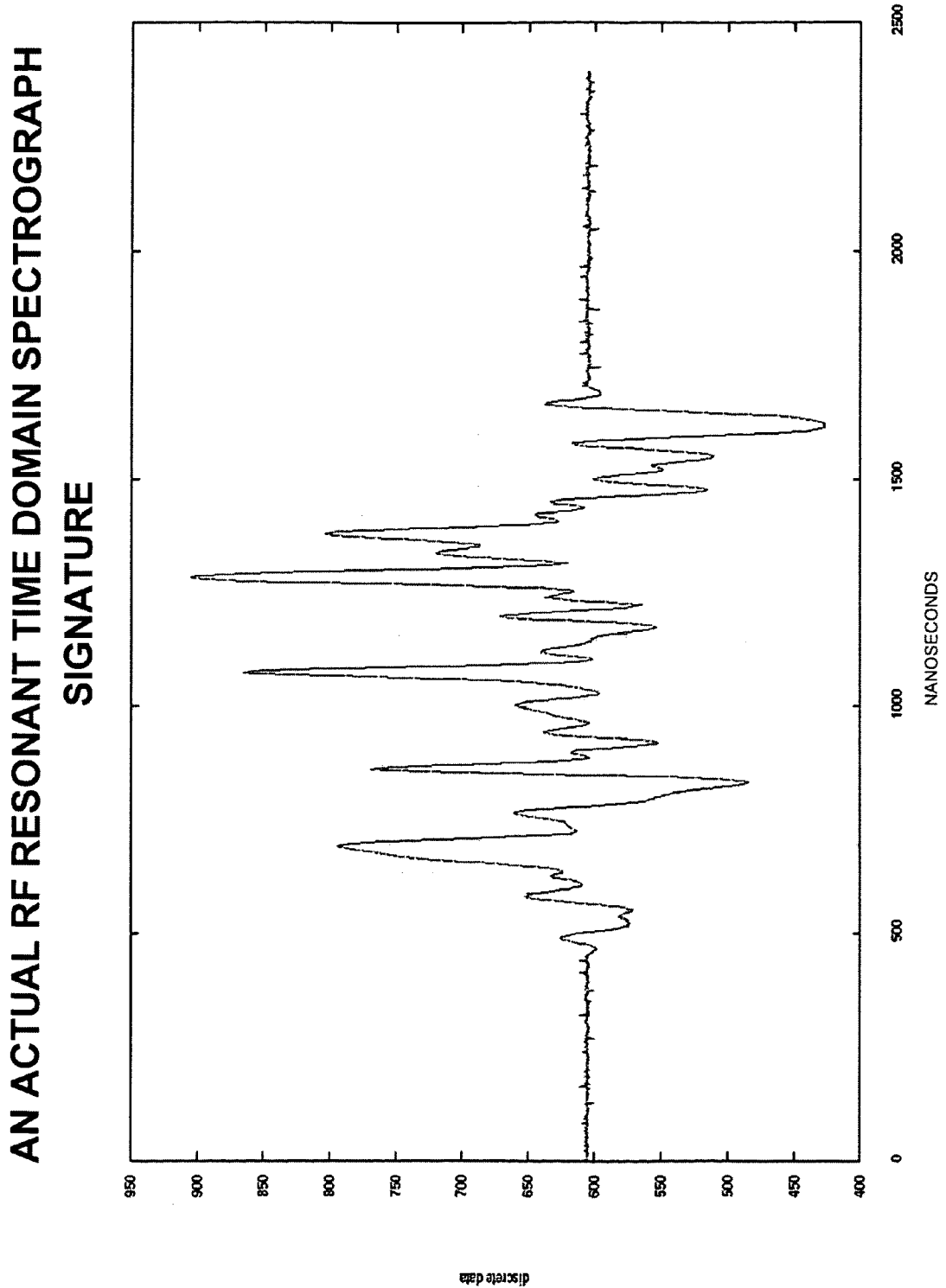
FIG. 3 is a sample time domain spectrograph signature of a label according to an aspect of the present invention.

Referring now to FIG. 3, there is shown a sample time domain spectrograph signature of a label according to an aspect of the present invention. As may be seen in FIG. 3, there is a portion where the resonators do not influence the data and there is a signature portion that is based on the resonators effecting the signal and producing a signature reflection as discussed above.

Figure 4:
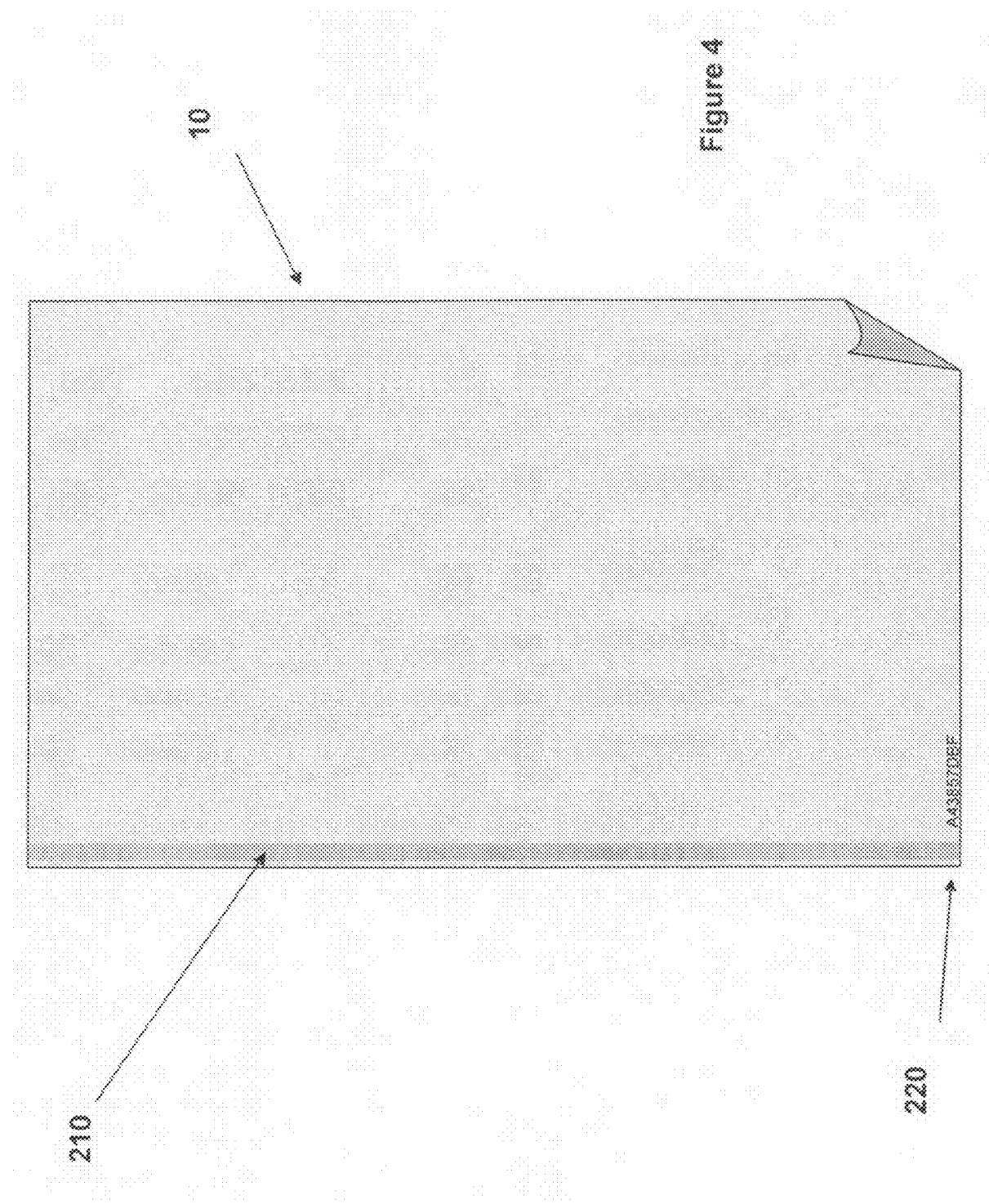
FIG. 4 is a scan track used for scanning the label according to an aspect of the present invention; and, FIG. 5 is a double scan track used for scanning the label according to an aspect of the present invention.

Referring now also to FIG. 4, there is shown a scan track used for scanning the label according to an aspect of the present invention. As may be seen in FIG. 4, scan track 210 uses a printed document file reference number 220 as an orienting guide point, and then may scan the tag in any manner, such as in a "cut" as shown. This scan 210 may provide a digital signature 110 that identifies the label 10 when compared to a database or library of labels. In so doing, the signature 110 identifies the label 10, which in turn identifies all of the information about the luggage, including the associated passenger and proper itinerary and bag network path, as described herein.

Figure 5:
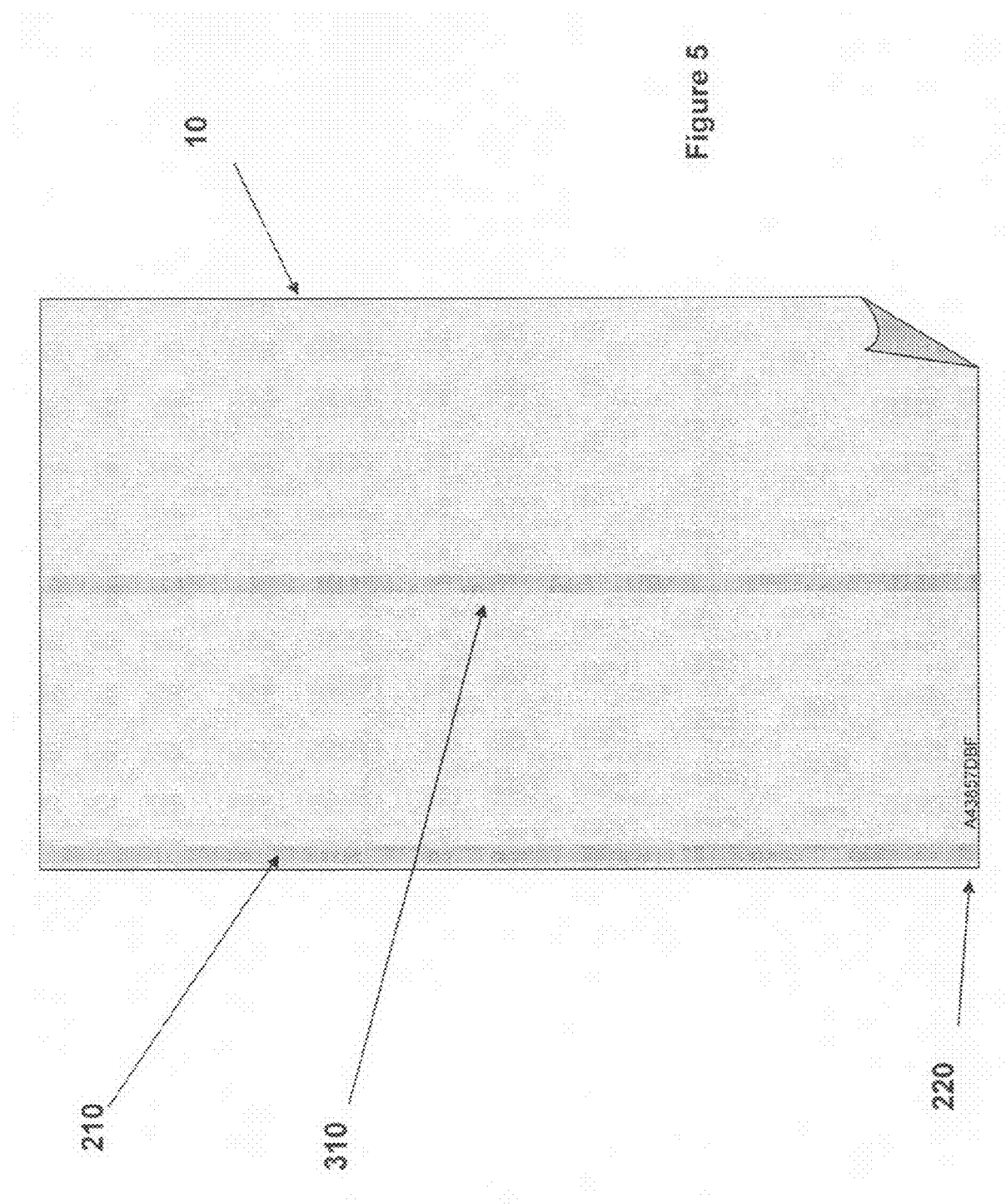

Referring now also to FIG. 5, there is shown a double scan track used for scanning the label according to an aspect of the present invention. As was described herein above with respect to the single scan track 210, the double scan track 210, 310 provides information about the label and in turn information about the luggage. The double scan 210, 310 may provide a second scan 310 to increase security. In this situation, the security and uniqueness is related to the number of data points collected. As such, increasing the number of data points for comparison increases the security and uniqueness of the identification.

Of course, other methodologies may be employed to orient the scanner with respect to the tag, such as while the bag moves along a conveyor, possibly with the tag off-angle to the scanner. For example, an optical scan may initially be performed at each scan point, such as to assess the location and/or angle of the aforementioned document number in a known label location, and/or to assess the location and/or angle of a bar code, and/or to assess the field view of a fluorescent tag of a known size and/or shape versus a known head-on field view for such a tag. Software may then be employed to manipulate the tag as-scanned into the orientation for which the scan is stored in the identifying database.

Further, such an optical scan may be re-used, such as to provide an additional identifying characteristic, such as in case the label discussed herein is lost or destroyed. Additionally, other scans may be provided in order to provide additional identification, such as a magnetic bag scan that substantially uniquely identifies a bag by its contents. Such additional scans may be stored, such as in a relational database, alongside the aforementioned information to identify each bag, including the unique label characteristics, passenger identification, itinerary information, and routing information discussed herein.

The current invention thus provides a baggage handling solution designed to significantly improve the accuracy, efficiency and security of current baggage handling processes, in part by using the resonators technology described herein to track and trace airline passenger baggage throughout the entire baggage handling process.

The resonator system overcomes many of the short-comings of silicon-based chip RFID, such as withstanding the presence of static electricity and other elements. RFID chips have typical failure rates between 40-100%. RFID scanning has a typical range of less than 2 meters, whereas the present resonator system allows tracking beyond 10 meters. The resonator system allows for inexpensive, truly passive and disposable RF technology for identification. The present invention further provides environmental acceptability, at least in that it does not use batteries, may employ resonators smaller than 4 microns in diameter, is very cost-effective technology, provides re-usable, non-apparent "barcodes," can be read through materials such as paper, cardboard, plastics. The present invention also provides increased security, at least in that it provides unique identifiers for security or tracking, minimizes vulnerabilities of other technologies, provides tamper evident technology, detectable alteration, deters counterfeiting and copying, provides fast data capture (approx 2 microseconds per bit) at 6 inches, and may be detected at 10 feet or more. The resonator system may also be compatible with IT/IS infrastructures, affordable, may allow for incremental implementation, is easily insertable into most manufactured goods, has selectable resonant frequencies, provides a unique 'Signature' at each frequency, and is invisible to the unaided eye.

For example, IATA report surveys indicate that it costs Airlines an average of $100 USD to locate lost baggage and return it to its owner. Therefore, the approximately 6.7 million bags mishandled annually in the US alone cost the industry more than $670 million. The present system may prove invaluable to the Airline Industry by providing a significant reduction in overall operating cost and an increase in customer goodwill. IATA undertook an airline campaign that highlighted where airlines thought the baggage handling process failed. The main causes of failure were due to punctuality, which is not solvable with RFID. IATA found that out of the 20 bags mishandled per 1,000 passengers 9.7% are due to poor barcode read rates and 11% are due to poor BSM handling. Failures in this costly system add increased costs from compensation paid when baggage is mishandled. Last year the industry paid $1.21 billion in direct compensation, and IATA estimates that the total industry costs, including labor, were $3.6 billion. In 2006, airlines of the Association of European Airlines (AEA) reported that they had mishandled 15.7 bags for every thousand passengers they had carried. That works out at over 5.6 million mishandled bags.

The present system may provide several key competitive advantages over competition, including: integration, privacy protection, implementation, increased read range, operation in harsh environments, and technical superiority.

The present system may use integration such that the solution is transparent to the baggage handling processes currently being employed, meaning products based on the present invention can seamlessly integrate into any existing platform.

The present system may use privacy protection such that the user privacy is protected and the need for additional government or corporate-based database systems is eliminated.

Further, the present system may provide implementation advantages that allow for simplistic integration into OEM systems and products.

An RFID research reports firm recently concluded a survey about RFID in the transportation sector. A blend of Third-Party Logistics Providers (3PL), trucking services, warehousing, air, ocean and rail carriers were selected for this survey. The survey indicated that 95% of the market is still untapped. Over 90% of the untapped market is either researching the feasibility of the RFID solutions or "waiting" to see the results of other companies. Customer compliance, improved efficiency and information accuracy are the most important reasons why companies are interested in RFID solutions.

Obstacles in implementing RFID solutions were also considered in this survey. The greatest impediment is the high cost of RFID hardware, software and integration. Another barrier is lack of industry standards. The survey also indicated that respondents felt the business case to implement RFID solutions was not strong due to high tag cost. These costs are particularly great in chip based solutions. However, the survey clearly concludes that demand for RFID solutions continues to rise and is Customer driven.

The present system may provide a bundled solution to these issues, designed to help the transportation sector track commercial baggage and analyze the tracking data for the purpose of improving efficiency and route optimization. This solution may include resonator labels, readers and the software to capture and analyze the data received from these devices. Further, as will be apparent to those skilled in the art, the present invention may provide software that is easy to use based on provision of a real time GUI that tracks bags, passengers, and itineraries in real time, and that is capable of virtually manipulating tags to improve readability and data flow. Although this solution may have an initial cost, the benefits far outweigh the costs. The resonator solution is less costly and technologically superior to any other currently proposed baggage tracking system. Implementation will involve attaching a resonator label baggage tag to each piece of luggage and installing resonator readers throughout the baggage handling system. The present system may be used in the baggage tags, boarding passes, scan stations, input terminals, hand-scan, middleware, software and security reporting.

The present system provides a solution that is more accurate and less costly to implement. Both physical and non-physical security may be retained and ensured by the resonator system. The resonator label, unlike existing RFID tracking systems, does not store any data, images or account information on any additional database or server, but rather is relational in nature to software that may relationally store desired data. This offers users the highest level of privacy where desired, and anonymity. The present system, unlike other chipless or chip based RFID tags, may provide the read rate, anti-collision and distance reading necessary to enhance baggage tag identification.

Additionally, the resonator labels and system may be added to barcode substrate at cost far less than chip based solutions. Reader technology can be added to barcode readers.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A baggage handling system incorporating a resonator based label system, said system comprising:
   a label for tracking and tracing at least one piece of baggage in the baggage handling system, said label including resonators doped into the label, said resonators passively providing the label with a unique signature, said label being attached to and referenced with said at least one piece of baggage;
   at least one reader for reading said label in order to properly direct said attached at least one piece of baggage;
   at least one computer that associates information of the label with information of a passenger associated with the at least one piece of baggage attached to the label; and
   at least one baggage mover suitable for moving said at least one piece of baggage within the baggage handling system.

2. The baggage handling system of claim 1, wherein said at least one baggage mover is a conveyor.

3. The baggage handling system of claim 1, further comprising a checker to enter said at least one piece of baggage into the baggage handling system.

4. The label of claim 1, wherein said label includes paper.

5. The label of claim 1, wherein said label includes plastic.

6. The label of claim 1, wherein said resonators doped into the label are doped during the pulping process for creating a paper based label.

7. The label of claim 1, wherein said resonators doped into the label are doped during the formation stage of a plastic based label.

8. The label of claim 1, wherein said resonators doped into the label have a controlled doping process.

9. The label of claim 8, wherein said controlled doping process provides optimal randomness in the label.

10. The label of claim 8, wherein said orientation mark includes a bar code.

11. The label of claim 8, wherein said orientation mark includes a numeric label located in a particular location on said label.

12. The label of claim 11, wherein said particular location includes the bottom left corner of said label.

13. The label of claim 1, wherein said resonators include dipoles.

14. The label of claim 1, wherein said resonators include nano-resonators.

15. The label of claim 1, wherein said resonators include crystals.

16. The label of claim 1, further comprising an orientation mark suitable for orienting the label for scanning of said resonators.

17. The label of claim 1, wherein said resonators respond to an interrogation based on the signature of the resonators.

18. The label of claim 17, wherein the response includes a signature of the label.

19. The label of claim 18, wherein the signature at least semi-uniquely identifies the label.

20. The label of claim 18, wherein the signature uniquely identifies the label.

21. The label of claim 18, wherein the signature is a time domain spectrograph signature identifying the label.

22. A baggage handling system incorporating a resonator based label system, said system comprising:
 a label for tracking and tracing at least one piece of baggage in the baggage handling system, said label including resonators doped into the label, said resonators passively providing the label with a unique signature, said label being attached to and referenced with said at least one piece of baggage;
 at least one reader for reading said label in order to properly direct said attached at least one piece of baggage;
 at least one computer that associates information of the label with information of a passenger associated with the at least one piece of baggage attached to the label; and
 at least one baggage mover suitable for moving said at least one piece of baggage within the baggage handling system; and
 a pusher for directing the baggage along the baggage mover according to the directions determined by using said reader to read said label.

23. The baggage handling system of claim 22, further comprising a sorting station for directing said at least one piece of baggage to an appropriate vehicle based on said a label for tracking and tracing baggage.

24. The baggage handling system of claim 23, wherein said sorting station loads said at least one piece of baggage onto a cart.

25. The baggage handling system of claim 23, wherein said sorting station loads said at least one piece of baggage onto a special container.

* * * * *